United States Patent
Shibuya

Patent Number: 5,758,541
Date of Patent: Jun. 2, 1998

[54] ENGAGING NOISE PREVENTING DEVICE FOR GEAR TRANSMISSION DEVICE

[75] Inventor: Takeshi Shibuya, Tokushima, Japan

[73] Assignee: Koyo Chicago Rawhide Co., Ltd., Tokushima, Japan

[21] Appl. No.: 414,644

[22] Filed: Apr. 3, 1995

[51] Int. Cl.⁶ .......................... F16F 15/12; F16H 55/14; F16T 15/32
[52] U.S. Cl. .................. 74/411.5; 74/467; 277/152; 384/485; 384/582
[58] Field of Search ................ 74/411.5, 467; 384/485, 536, 582; 277/207 R, DIG. 9, 29, 134, 152

[56] References Cited

U.S. PATENT DOCUMENTS

| | | | |
|---|---|---|---|
| 4,448,461 | 5/1984 | Otto | 277/29 X |
| 4,819,949 | 4/1989 | Otto | 277/29 |
| 4,919,551 | 4/1990 | Nunotani et al. | 384/485 X |
| 4,986,318 | 1/1991 | Yun | 277/152 X |
| 4,998,600 | 3/1991 | Fuhrer et al. | 277/152 X |
| 5,044,642 | 9/1991 | Vogt et al. | 277/134 |
| 5,139,275 | 8/1992 | Ehrmann et al. | 277/134 |
| 5,143,382 | 9/1992 | Maringer | 277/29 |
| 5,143,385 | 9/1992 | Sponagel et al. | 277/134 |
| 5,195,757 | 3/1993 | Dahl | 277/134 |
| 5,350,181 | 9/1994 | Horve | 277/152 X |
| 5,427,387 | 6/1995 | Johnston | 277/152 |

FOREIGN PATENT DOCUMENTS 63-187747  12/1988  Japan.

*Primary Examiner*—Charles A. Marmor
*Assistant Examiner*—Troy Grabow
*Attorney, Agent, or Firm*—Reid & Priest LLP

[57] ABSTRACT

In an elastic frictional member including: a core ring fitted on a sleeve fixedly mounted on a shaft; and an elastic element engaged with the outer cylindrical surface of the core ring, a plurality of small protrusions are extended from the outer surface of a lip forming a part of the elastic element; that is, from a slide surface of the elastic element which is in slide contact with the inner cylindrical surface of a shaft hole formed in the gear. The small protrusions of the lip are in point contact with the inner cylindrical surface of the shaft hole of the gear; that is, the outer surface of the lip from which the small protrusions are extended is spaced from the inner cylindrical surface of the shaft hole of the gear, thus allowing the formation of a lubricant film in the space. The lubricant film thus formed maintains the friction coefficient substantially constant.

4 Claims, 3 Drawing Sheets

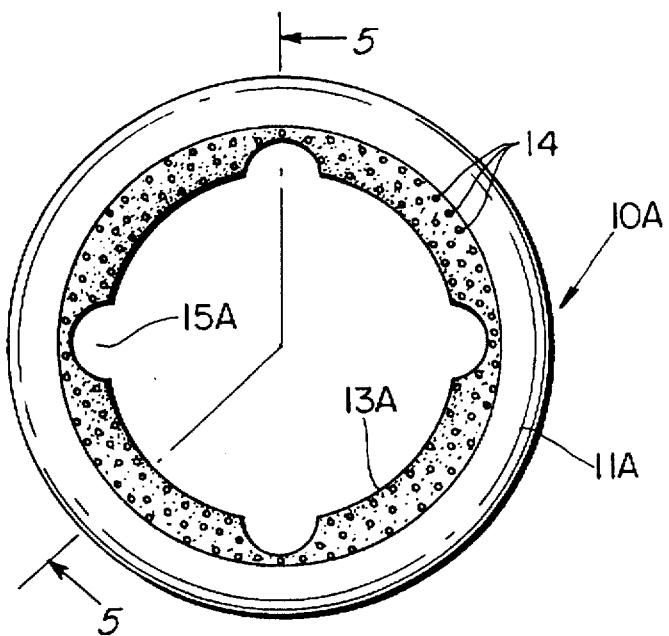
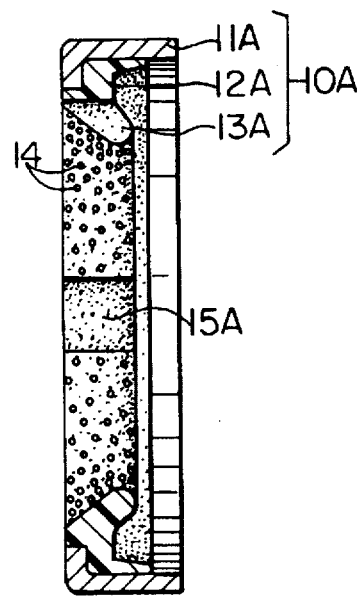
FIG. 4    FIG. 5
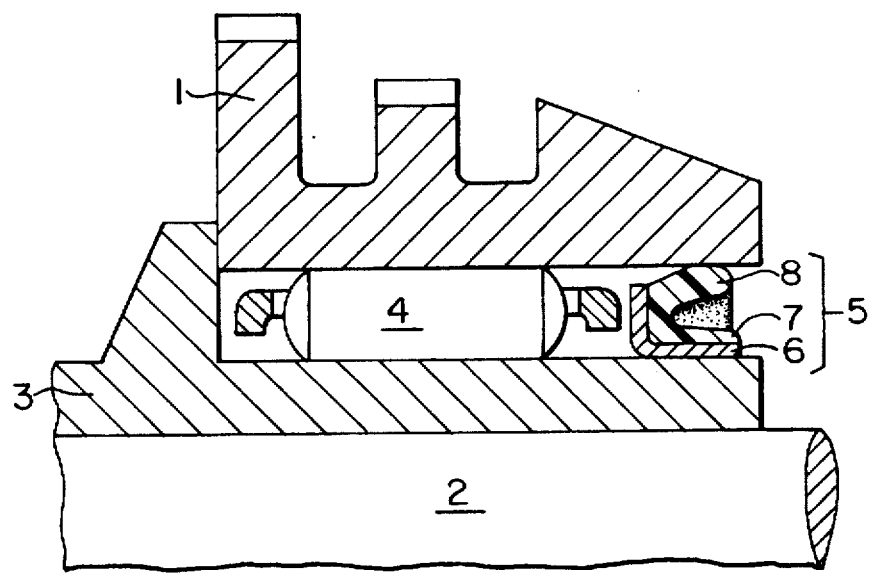
FIG. 8
PRIOR ART

ENGAGING NOISE PREVENTING DEVICE FOR GEAR TRANSMISSION DEVICE

BACKGROUND OF THE INVENTION

This invention relates to a device for preventing the production of engaging rattle noises of internal gears in a gear transmission device such as a manual transmission in an automobile (hereinafter referred to as "an engaging rattle noise preventing device", when applicable), and more particularly to a technique of stabilizing the rotational resistance thereof which attributes to an elastic frictional member employed therefor.

A transmission in an automobile comprises a gear which is rotated in association with the crank shaft of the engine; and a gear shaft which rotatably supports the gear. When the irregular vibration of the crank shaft is transmitted to the gear during travel of the automobile, the gear makes a noise peculiar to it.

In order to prevent the production of the rattle noise, an elastic frictional member is, in general, interposed between the gear and the gear shaft which rotatably supports the gear; that is, friction is suitably provided between the gear and the gear shaft to prevent the production of the rattle noise.

An example of the conventional elastic frictional member is as shown in FIG. 8. In FIG. 8, reference numeral 1 designates a gear; 2, a gear shaft; 3, a sleeve which is fixedly mounted on the gear shaft 2, rotating together with the gear shaft 2; 4, a needle roller bearing; and 5, the elastic frictional member.

As shown in FIG. 8, the conventional elastic frictional member, being similar to an ordinary oil seal, comprises: a core ring 6 fitted on the sleeve 3 which is a member on the side of the gear shaft 2; and an elastic element 7 of rubber or the like which is engaged with the outer cylindrical surface of the core ring 6. The elastic element 7 has a skirt-shaped lip 8 which is in sliding contact with the inner cylindrical surface of a shaft hole formed in the gear 1.

In general, in the elastic frictional member 5, the lip 8 is in facing contact with the inner cylindrical surface of the shaft hole of the gear 1; that is, the relatively smooth surface of the lip 8 is in contact with the inner cylindrical surface of the shaft hole which is also relatively smooth, so that lubricant is liable to be scraped off the slide surface thereof; that in, it is difficult to form a lubricant film there. As a results the lip is increased in rotational resistance, and generates heat abnormally. In the case where the lip is turned at high speed, its lubrication becomes insufficient soon, so that the lip may be seized or abnormally worn. That is, the elastic frictional member is insufficient in durability.

SUMMARY OF THE INVENTION

In view of the foregoing, an object of the invention is to suppress the rotational resistance between the elastic frictional member and a mating member with which the elastic frictional member is in contact, and to continue the suppression of the rotational resistance for a long time.

In order to achieve the foregoing object, the invention provides an engaging rattle noise preventing device for a gear transmission device in which a gear is rotatably supported on a gear shaft through a bearing, the device comprising:

an elastic frictional member disposed between a gear and a gear shaft and adjacent the bearing, the elastic frictional member including:
 a metal core non-rotatably fitted on one of the gear and the gear shaft; and
 an elastic element set integral with the metal core in such a manner that the elastic element is in sliding contact with the other of the gear and the gear shaft, wherein the elastic element is formed with a plurality of small protrusions formed on a sliding surface thereof so that the small protrusions define a lubricant holding space.

The elastic element, being in sliding contact with the inner cylindrical surface of a rotating member, provides friction. The elastic element is in contact with the rotating member through the small protrusions; that is, the surface of the elastic element from which the small protrusions are extended is spaced from the rotating member, thus allowing the formation of a lubricant film therebetween. That is, in the device of the invention, unlike the prior art in which the lubricant film is scraped off, the lubricant film is maintained for a long time.

BRIEF DESCRIPTION OF THE DRAWING

FIG. 4 is a front view of another example of the engaging rattle noise preventing device, which constitutes a second embodiment of the invention, corresponding to FIG. 2.

FIG. 5 is a sectional view taken along line (5)—(5) in FIG. 4.

FIG. 8 is a longitudinal sectional view showing the use of a conventional engaging rattle noise preventing device.

DETAILED DESCRIPTION OF THE PREFERRED EMBODIMENTS

Figure 1:
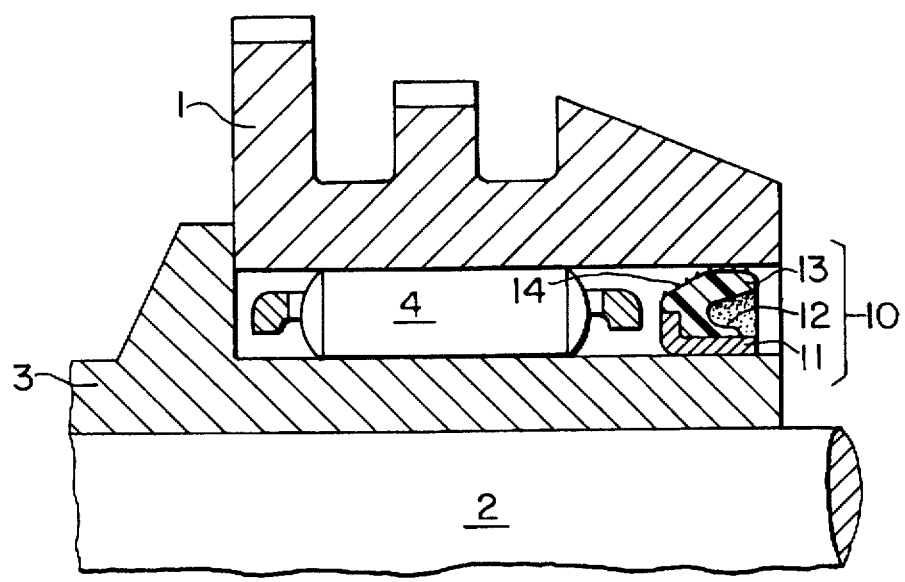
FIG. 1 is a longitudinal sectional diagram showing the use of an example of an engaging rattle noise preventing device, which constitutes a first embodiment of the invention.
Figure 2:
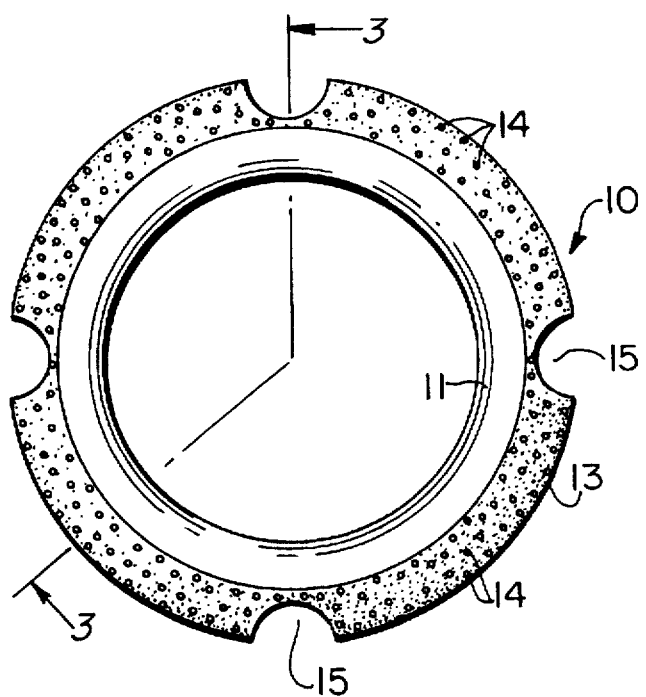
FIG. 2 is a front view of an elastic frictional member shown in FIG. 1.
Figure 3:
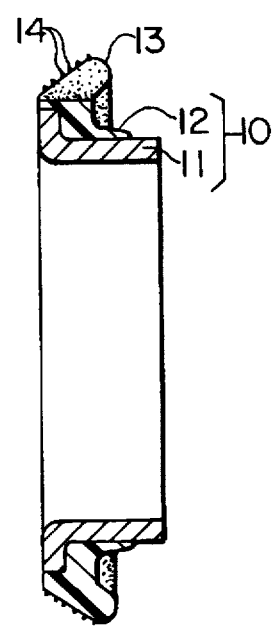
FIG. 3 is a sectional view taken along line (3)—(3) in FIG. 2.

A first embodiment of the invention will be described with reference to FIGS. 1 through 3, in which parts corresponding functionally to those which have been described with the prior art shown in FIG. 8 are therefore designated by the same reference numerals or characters. In those figures, reference numeral 1 designates a gear; 2, a gear shaft; 3, a sleeve which rotates together with the gear shaft 2; and 4, a needle roller bearing.

An elastic frictional member 10 comprises: a core ring 11 mounted on the sleeve 3 which is a member on the non-rotation side in this embodiment; and an elastic element 12 which is engaged with the outer cylindrical surface of the core ring 11 in such a manner that it is in sliding contact with the inner cylindrical surface of a shaft hole formed in the gear 1 which is a member on the rotation side. The core ring 11 is made of an elastic material having a certain width, and it is substantially L-shaped in section. The elastic element 12 is made of rubber or the like, and has a predetermined thickness. The elastic element 12 is mounted on the core ring 11 in such a manner as to cover the whole outer cylindrical surface of the latter 11. The elastic element 12 includes a skirt-shaped lip 13 which is substantially in the form of a circular truncated cone. The lip 13 has a plurality of small protrusions 14 extended from its outer sloped surface, and four semi-circular cuts 15 as lubricant passageways in the outer periphery at angular intervals of 90°. The small protrusions 14 are about 5 to 20 μm in height and in diameter. The protrusions 14 are formed simultaneously when the elastic frictional member 10 is formed with a metal mold; that is, they are transferred from the metal mold in molding the elastic friction member 10.

When the elastic frictional member 10 is interposed between the gear 1 and the gear shaft 2 of a gear transmission device such as an automobile transmission, the lip 13 is brought into sliding contact with the inner cylindrical surface of the gear 1, thus providing friction therebetween. On the other hand, the small protrusions 14 of the lip 13 are brought into point contact with the inner cylindrical surface of the gear 1, thus forming a space between the inner cylindrical surface of the gear 1 and the outer aloped surface of the lip 13 from which the small protrusions are extended. Hence, a lubricant film is formed in the space thus formed. As is apparent from the above description, in the embodiment, unlike the prior art in which the lubricant film is scraped off, the lubricant film is maintained for a long time. Since the lubricant film is held in the sliding region, the friction coefficient is maintained substantially constant, and the rotational resistance is suppressed, and the generation of abnormal heat is prevented.

Figure 6:
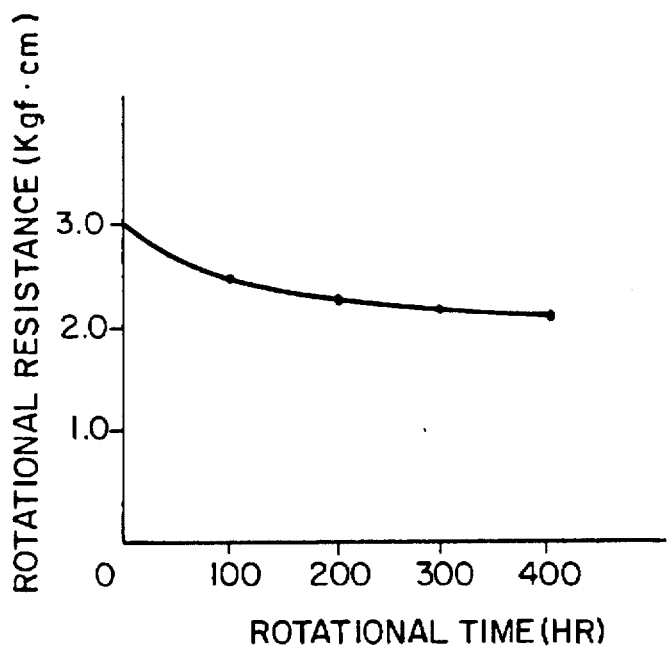
FIG. 6 is a graphical representation indicating rotational resistance with rotational time with respect to the device shown in FIG. 1.
Figure 7:
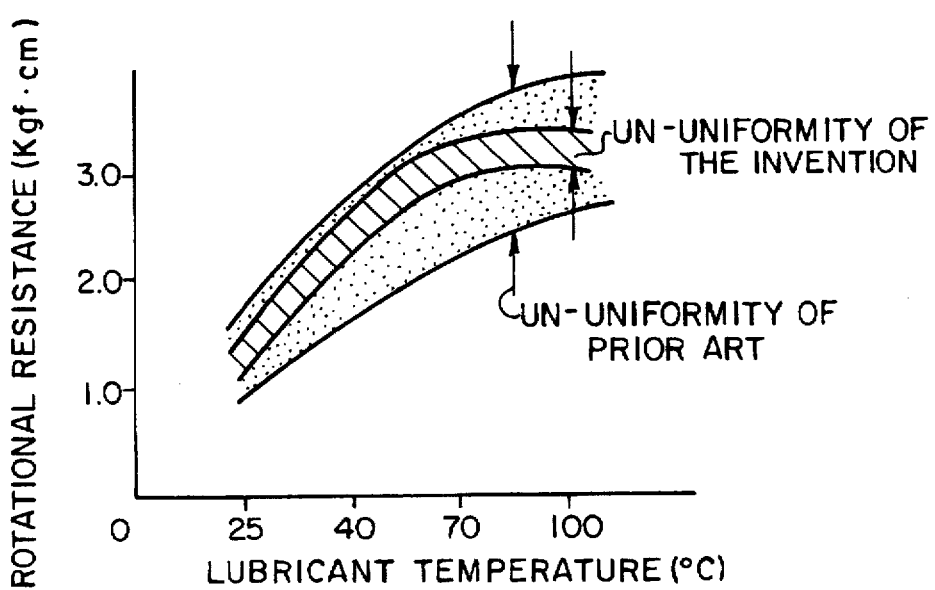
FIG. 7 is a graphical representation indicating rotational resistance with lubricant temperature with respect to the device shown in FIG. 1.

In this connection, FIG. 6 indicates rotational time with rotational resistance, and FIG. 7 indicates lubricant temperature with rotational resistance. In the case of FIG. 6, the rotational resistances were measured under the conditions that the master gear was rotated at 15 rpm and the lubricant temperature was 70° C. at each point at which the initial setting operation under the condition that the speed of rotation was 4500 rpm, the lubricant was gear oil, and the lubricant temperature was 100° C. had been performed for 50 hours, 100 hours, 200 hours, 300 hours and 500 hours. In the case of FIG. 7, the rotational resistances were measured under the conditions that the master gear was rotated at 15 rpm with the lubricant temperature was changed to, 25° C., 40° C., 70° C. and 100° C.

As is apparent from the graphical representations of FIGS. 6 and 7, even after the rotational time of 400 hours, the rotational resistance was suppressed to about 2.1 kgf.cm, and the lip slide temperature which is heretofore +30° to 40° C. was suppressed low, 15° C. Variations in rotational resistance with each lubricant temperature were limited smaller than in the prior art.

In the embodiment, the small protrusions 14 of the lip 13 are worn first. In the conventional elastic frictional member, the rotational resistance is greatly decreased in proportion to the wear of the lip. On the other hand, in the elastic frictional member of the invention, as the small protrusions 14 are worn, the contact area of the small protrusions 14 with the mating part on which the small protrusions 14 are in contact is increased, and the rotational resistance is only slightly increased; that is, the torque is scarcely changed with time.

A second embodiment of the invention is as shown in FIGS. 4 and 5. In the second embodiment, an elastic frictional member 10A comprises: a core ring 11A which is fitted in a shaft hole formed in a gear 1 which is a member on the non-rotation side in this embodiment; and an elastic element 12A which is engaged with the inner cylindrical surface of the core ring 11A in such a manner that it is in sliding contact with the outer cylindrical surface of a sleeve which is a member on the rotation side.

As is apparent from the above description, according to the invention, a lubricant film is maintained in the contact region for a long time. which suppresses increase in the coefficient of friction, stabilizes the rotational characteristic, and avoids the abnormal heat generation.

Therefore, the elastic frictional member of the invention performs its main function of providing friction, not adversely affecting the friction.

What is claimed is:

1. An engaging rattle noise preventing device for a gear transmission device in which a gear is rotatably supported on a gear shaft through a bearing, said device comprising:

an elastic frictional member disposed between a gear and a gear shaft and adjacent said bearing, said elastic frictional member including:

1) a metal core non-rotatably fitted on one of said gear and said gear shaft; and 2) an elastic element set integral with said metal core and having a slide surface in sliding non-sealing contact with the other of said gear and said gear shaft, wherein said slide surface includes:

2a) a plurality of semi-circular cuts which serve to permit the passage of lubricant from one side to an opposite side of the elastic element and 2b) a plurality of small randomly positioned protrusions formed on said slide surface so as to define a lubricant holding space on said slide surface; wherein:

A) each of said small randomly positioned protrusions is 5 to 20 μm in height and diameter; and B) said semi-circular cuts are of a depth that greatly exceeds the height of said randomly positioned protrusions.

2. An engaging rattle noise preventing device according to claim 1, wherein:

said gear shaft includes a sleeve non-rotatably fitted thereon.

3. An engaging rattle noise preventing device according to claim 1, wherein:

said metal core is annular, and said elastic member is fixed on an inner periphery of said metal core.

4. An engaging rattle noise preventing device according to claim 1, wherein:

said metal core is annular, and said elastic member is fixed on an outer periphery of said metal core.

* * * * *